May 30, 1967  C. W. SHAW  3,321,925
DEEP WATER LAY BARGE AND METHOD
Filed May 5, 1964  5 Sheets-Sheet 1
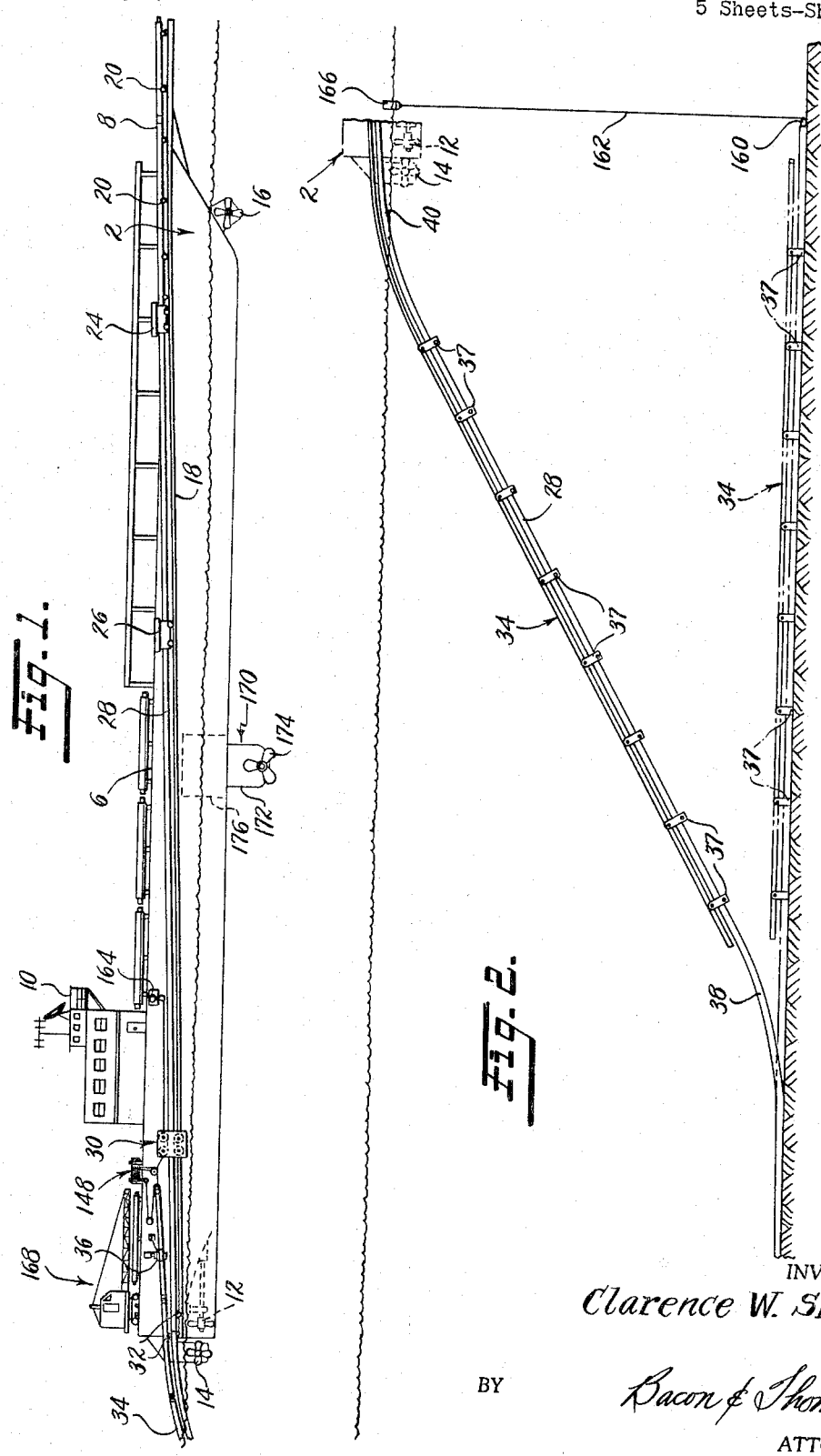
INVENTOR
Clarence W. Shaw
BY
Bacon & Thomas
ATTORNEYS

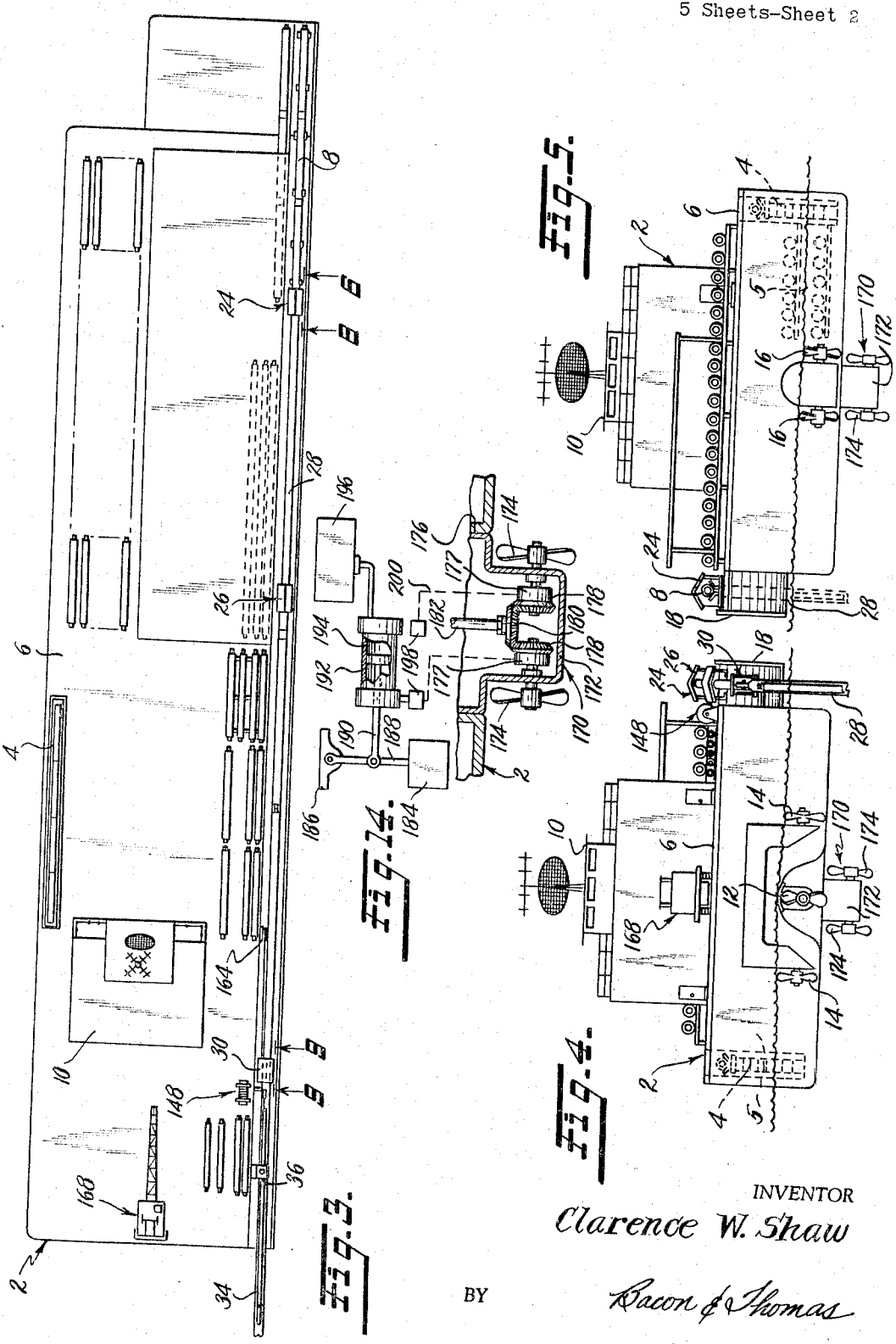

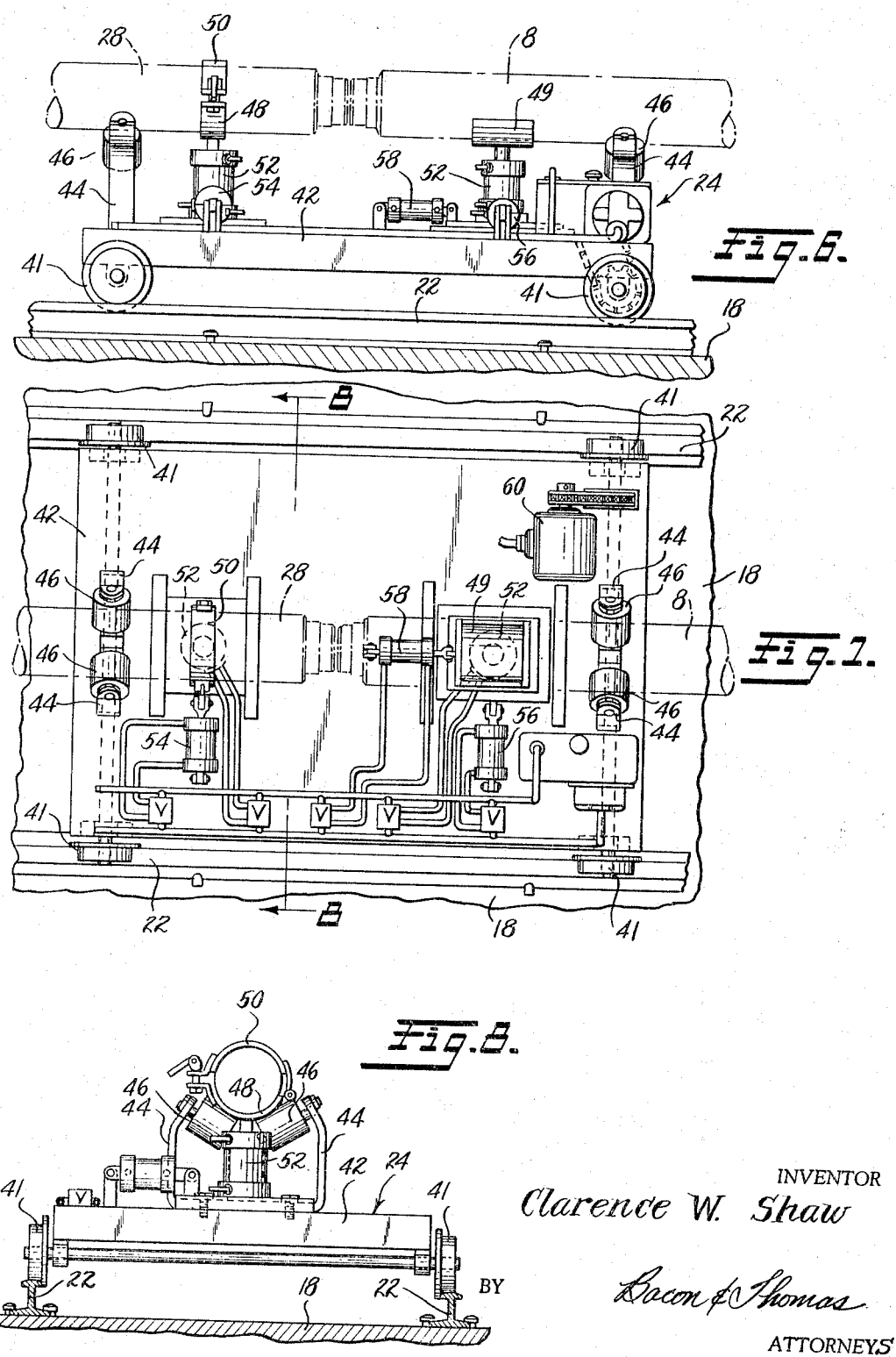

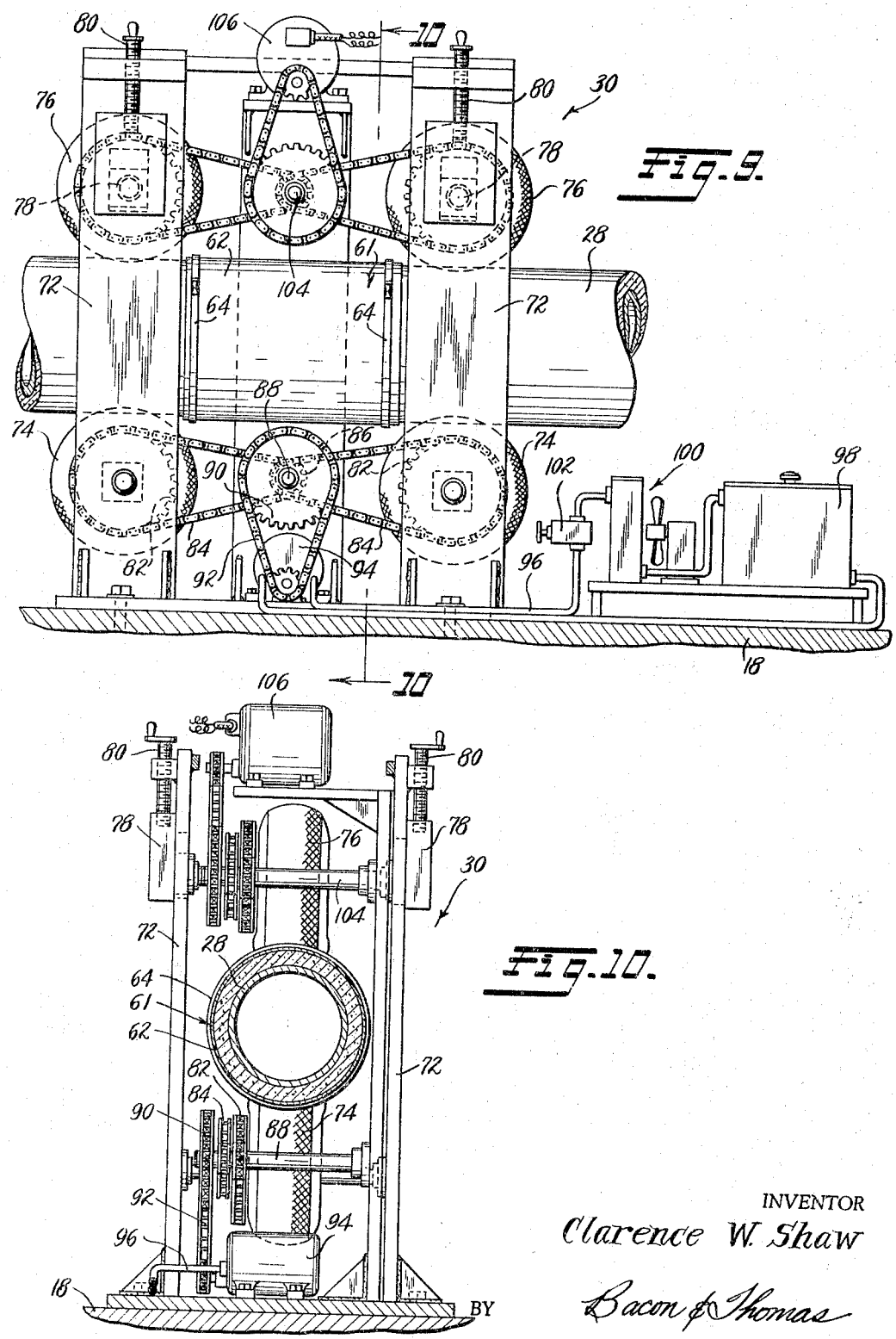

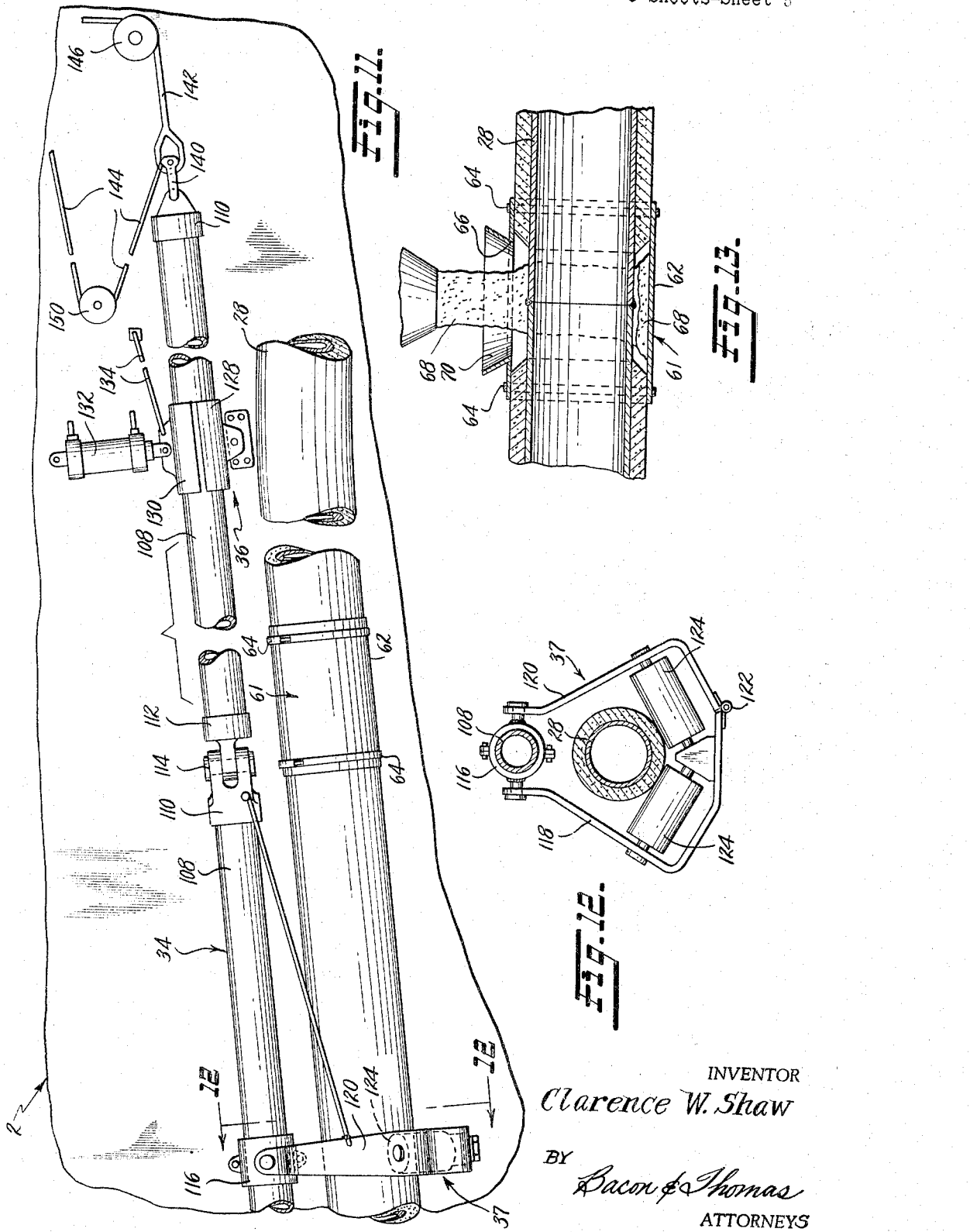

3,321,925
DEEP WATER LAY BARGE AND METHOD
Clarence W. Shaw, Metairie, La., assignor, by mesne assignments, to J. Ray McDermott and Co., Inc., New Orleans, La., a corporation of Delaware
Filed May 5, 1964, Ser. No. 364,933
10 Claims. (Cl. 61—72.3)

The present invention relates to a pipe-laying barge and method by which may be pipe laid in water depths as great as several thousand feet, continuously, rapidly and economically.

In marine pipe laying operations the usual procedure is to join mill lengths of pipe together by butt welding and launch them into water from a barge. This is accomplished by moving the barge forward a distance equal to the length of the pipe joint last welded; stopping the barge and aligning and welding another joint.

Previously such barges have been provided with means to contact the ocean bottom in some manner to control position and sometimes position and movement. The spud barge system is usually propelled along its pipe laying path intermittently by applying force to the string of pipe to push the barge forward; then stopped and held in welding position by spuds which project from the bottom of the barge and are dropped into the ocean bottom to stop and hold the barge and which are then raised above the bottom to allow the barge to move. The spud barge system is for relatively shallow water due to the limitation of spud length.

A second type is the anchor barge which can work in deeper water than the spud barge, as it is positioned by the use of anchors on long cables which are controlled by winches. Usually there are eight of these cables, anchors and wiches, with the cables fanning out from the bow and stern; whereby the barge can be quickly and accurately moved along and stopped for each pipe joint welding operation. Such barges can work in quite deep water; however, in deep water, due to waves, tides and currents, other troubles develop in the launching of the welded string of pipe.

Another barge structure now in use for launching pipe from a lay barge in fairly deep water is a launching ramp secured to the rear of the lay barge. This is a steel structure pivoted to the barge stem for vertical movement only, and may exceed 500 feet in length. The trailing end of this structure rides on the ocean bottom on a shoe. The launched pipe is cradled in this structure on rubber covered rolls. Pipe has been laid in water depths up to 200 feet by this method, but due to stresses created in a seaway this method becomes impractical and may failures have occurred.

Usually steel pipe for underwater use is coated with a corrosion preventing material, and in the larger pipe sizes, weights or weighted coating must be added to prevent the pipe's buoyancy from bringing it to the surface. In the larger pipes such coatings may be concrete for weight, which is substantially rigid. Such weight coatings usually are designed to give the empty pipe a specific gravity of from 1.05 to 1.50. In launching such pipe from the horizontal or straight position on the barge, it must be allowed to bend convexly on the upper surface in its path to the bottom and again concavely on its upper surface as it approaches the ocean floor to a horizontal position again. The pipe is thus subject to stress and movement from wave action, current and tides and as the depth and weight increase the strains and curvature become unmanageable and the pipe and/or pipe coating are damaged or destroyed.

In general, the present invention comprises a barge or other buoyant vehicle which is in no way connected to the ocean bottom but which contains a plurality of propellors directed in various directions whereby the direction of movement, lateral position and heading of the barge may be accurately controlled. Proper positioning of the barge along the intended pipe laying path can be accomplished by line of sight, buoys, or targets, or through one or more of the well-known electronic guidance systems, including the VHF, omni, low frequence range stations, radar, or any combination of these and other systems. If necessary or desirable, tugs may also be used to assist in directing and/or propelling the barge.

The barge is provided with a supply of pipe sections which can be assembled into longer units and then secured, as by welding into a continuous length of pipe, guided and directed rearwardly and downwardly from the barge onto the ocean bottom. The barge is provided with a ramp down one side thereof to a position at the stern just above the water level. On this ramp the final assembly of continuous pipe is launched into the water. The finished and launched pipe is guided through and partly supported by a continuous articulated float arrangement so as to decrease the apparent weight of the pipe while it is suspended between the water surface and the ocean bottom. The float arrangement comprises steel tubes, which may be 40 foot mill lengths and used in number varying with the water depth. The continuous string of pipe being laid will be coated or otherwise treated so as to be sufficiently heavy to sink and stay on the bottom after laying. The barge may be moved either intermittently or continuously. To perform the continuous type of operation it is necessary to carry pipe welders and related equipment down the ramp as the pipe moves theredown during forward movement of the barge.

The present invention contemplates launching the pipe from one side of the barge, which necessarily rises and falls as the vehicle "rolls" about its longitudinal axis as a result of wave action. The invention therefore includes a power driven roll stabilizer.

Of primary importance is the feature of applying tension to the launched string of pipe to prevent undue curvature thereof in the suspended portion between the barge and the ocean bottom and to limit curvature and flexure from other influences to safe limits. This tension is applied by employing restraining means near the stern of the barge engageable with the pipe just before launching and operable to apply considerable resistance to relative movement between the barge and pipe. Sufficiently high propelling forces are applied to the barge so as to not only overcome the restraint to pipe movement but to also provide a small additional forward propelling force so that the barge can be moved forwardly at a slow rate of speed, probably less than one-half mile per hour. When operating in deep ocean water, which may be several thousand feet deep, a considerable footage of pipe is held freely suspended between the ocean floor and the stern of the lay barge. This suspended pipe can act as a pendulum substantially frictionlessly suspended and, therefore, small forces thereon can cause large oscillatory motions. The barge is connected to the upper end of the pipe and is itself also acted upon by wave and water motion. The barge thus moves with the waves and that motion is transmitted to the suspended pipe. Since both the pipe and barge are acted upon by the same wave forces, the frequency thereof may well fall in harmony with the natural frequency of vibration of the suspended pipe, taking into account the dampening effect of the water, in which case energy will be imparted to the pipe string and its amplitude of oscillatory motion may be increased and build up to destructive proportions. By placing this suspended pipe under heavy tension, which may be up to 100,000 pounds, the motion amplitude will be dampened or decreased with corresponding decrease in stresses. The tension applied to the pipe has the effect of changing the pipe frequency to one that is not in harmony with the barge or wave motion.

The stabilizing tension placed on the pipe does not impose a harmful stress thereon since the thinnest wall pipe which would be used for such purposes would have the steel walls of a one-half inch thickness and would be of the order of thirty inches in diameter. Stressing the metal of such a pipe to a unit stress of 29,000 pounds per square inch would be over 1,000,000 pounds of total tension whereas tension of only about 10% of this figure would be adequate for stabilization. In addition, the tension on the pipe will increase the radius of curvature of the curved portions thereof, which also reduces the bending stresses. Obviously, the pipe tensioning features could be used to advantage not only in cases where a self propelled barge is used but also when the barge is advanced and controlled by a plurality of anchors and winches, as previously mentioned.

It is, therefore, a principal object of this invention to provide a method and apparatus for laying non-buoyant pipe in deeper water than has been heretofore practical.

Another object of the invention is to provide a method and apparatus for laying a continuous length of non-buoyant pipe in deep water while always holding said pipe in tension to prevent destructive flexure.

Still another object of the invention is to provide a method and apparatus of the type set forth which may be operated either continuously or intermittently.

A further object is to provide a method and apparatus as set forth wherein the pipe may be capped and dropped to the bottom of the ocean when necessary and lifted and recovered later to continue the laying operations, all without undue flexure or destructive stresses.

A still further object is to provide for stabilizing a lay barge against excessive roll.

Additional and further objects and advantages will become apparent to those skilled in the art as the description proceeds with reference to the accompanying drawings wherein:

FIG. 1 is a schematic side view of a pipe laying barge according to the present invention;

FIG. 2 is a view of a continuation of the apparatus shown in FIG. 1 and showing the suspended portion of a pipe and part of the apparatus in side view;

FIG. 3 is a top plan view of the barge shown in FIG. 1;

FIG. 4 is a stern view of the barge taken from the left of FIG. 3;

FIG. 5 is a bow view of the barge taken from the right hand end of FIG. 3;

FIG. 6 is an enlarged vertical sectional view taken generally along the line 6—6 of FIG. 3;

FIG. 7 is a top plan view of the apparatus of FIG. 6;

FIG. 8 is an end view of FIG. 7;

FIG. 9 is a vertical sectional view, on an enlarged scale, taken along the line 9—9 of FIG. 3;

FIG. 10 is a vertical sectional view taken on the line 10—10 of FIG. 9;

FIG. 11 is a fragmentary side view, on a greatly enlarged scale, of a portion of the apparatus shown in FIG. 1;

FIG. 12 is a vertical sectional view taken along the line 12—12 of FIG. 11;

FIG. 13 is a vertical sectional view taken through a welded pipe joint showing the manner in which the pipe coating is patched after the joint is formed; and FIG. 14 is a schematic illustration of a power driven roll stabilizer.

Referring first to FIGS. 1 through 5, there is shown a buoyant vehicle referred to as barge 2 having a hold 5 in which pipe sections, fuel, and other supplies may be stored. An elevator 4 is provided for lifting sections of pipe from the hold to the deck 6 and for lowering supplies into the hold. On the deck 6 mill length pipe sections may be assembled and aligned, welded, tested and coated over the welded joints to form longer pipe lengths 8 consisting of several mill sections joined together. The barge will also include a suitable control structure 10 comprising navigation enclosures, crew quarters, etc. As apparent from FIGS. 4 and 5, the stern of the barge is provided with a rearwardly directed propellor 12 for providing forward propelling thrust and a pair of selectively operable laterally directed propellors 14 which may be operated as necessary to correct or maintain the lateral position and/or heading of the barge 2. Likewise, at the bow end the barge is provided with a pair of laterally directed propellors 16 which may also be operated selectively to perform further precise control of the lateral position and/or heading of the barge. On one side of the barge a ramp 18 is formed, which ramp slopes downwardly and rearwardly from a forward position at the level of deck 6 near the bow of the vehicle and downwardly and rearwardly to a position shown here as only slightly above water level at the stern. In some cases, however, the rear end of ramp 18 may be under water for better cooling of the hot field joints placed over the pipe welds, as will be described.

Preferably, the barge will be loaded with supplies and pipe sections, fuel and the like so that their center of gravity is positioned (and maintained as they are used) somewhat forwardly of the center of buoyancy of the vehicle, just far enough so that as those supplies are used up the elevation of the rear end of ramp 18 does not change to any great extent relative to the water line. The ramp 18 is provided with pipe supporting and guiding roller devices 20 at its forward end and is further provided with a trackway comprising rails 22 (see FIGS. 6–8) for supporting and guiding carriages 24 and 26 shown only schematically in FIG. 1. The carriages 24 and 26 serve to support the pipe 28 during its movements downwardly and rearwardly of the ramp and serve to align each new pipe section 8 with the continuous string 28 and to hold them is alignment during welding operations, all as will be described in more detail. The carriages 24 and 26 are releasably clamped to the pipe 28 so that they move downwardly and rearwardly on the ramp as the barge moves forwardly under the pipe 28.

Near the stern of the barge 2, a restraining mechanism 30 is provided which engages the pipe 28 and provides considerable resistance to relative movement between the continuous pipe 28 and the barge 2.

The magnitude of this restraint predetermines the amount of tension applied to the suspended portion of the pipe 28 between the barge and the ocean floor. This structure will likewise be described in greater detail later. Preferably, the barge is provided with further roller supporting and guiding means 32 at the stern end of ramp 18 and over which the rear end of the pipe 28 passes before entering the water. The means 32 may be a pair of roller cradles, as shown, spaced to bridge soft or hot field joints passing thereover or may be in the form of a short endless belt or the like. An articulated string 34 (FIG. 2) of float members is releasably clamped to the side of the barge as at 36 and each member supports a depending roller cradle over which the pipe 28 passes. The cradles 37 and the buoyancy of the string 34 thus at least partially support the weight of the suspended section of pipe 28 and thus reduce the bending moments thereon.

Assuming the barge is being employed to lay 30 inch O.D. pipe having a one-half inch wall thickness and on which a heavyweight coating 3½" thick is applied, the weight per linear foot of such coated pipe in air may be 513.9 pounds. That same length of pipe will displace 477.8 pounds of sea water, leaving a total negative buoyancy of about 36 pounds per foot of pipe. Thus, in sea water 2,000 feet deep and using a suspended length of pipe of about 4,000 feet, the weight-in-water of the suspended pipe would be of the order of 72 tons. It is to reduce this vertical load that the float system 34 is provided. This not only enables the pipe to be tensioned with less forward thrust on the barge but also insures that the tension applied will maintain the curved portions 38 and 40 at such a long radius of curvature that undue stresses are not set up in the pipe 28.

Referring now more particularly to FIGS. 6, 7 and 8, there is shown therein a more detailed illustration of the carriage 24, previously referred to. The carriage 24 is provided with supporting wheels 41 riding on the tracks 22 and which movably support carriage platform 42. The platform 42 is provided with a pair of upstanding brackets 44 on each of which a pair of rollers 46 are journalled to define a V-shaped roller cradle for supporting the continuous pipe 28 or a pipe section 8. In addition to the roller cradles described, the platform 42 is also provided with a pair of saddle structures 48 and 49 adapted to engage and support the coated pipe. At least the saddle 48 is provided with a clamping member 50 operable to clamp the saddle to the pipe. Saddle 49 may also be provided with a similar clamping member. Since the saddle 48 is carried by the platform 42, the clamp 50 thereby clamps the entire carriage to the pipe 28 for movement therewith. Each of the saddles 48 and 49 is vertically movable by means of a double-acting hydraulic jack 52 whereby either or both may be raised or lowered selectively. In addition, the rearmost jack 52 supporting saddle 48 is mounted for lateral movement on the platform 42 under the control of a hydraulic jack 54. The forward saddle 49 is likewise mounted for lateral movement on platform 42 under the control of a hydraulic jack 56 and in addition, is mounted for fore and aft movement, under the control of a further hydraulic jack 58. Suitable piping and control valves are provided for selectively operating any of the described jacks. The carriage 24 shown in FIGS. 6 through 8 is also provided with a propelling means 60 connected to one of the axles supporting a pair of the wheels 40 whereby the carriage may be independently driven along the tracks 22. Thus, the carriage may be moved to the forward end of the continuous length of pipe 28 so that its rear saddle 48 is positioned adjacent the end of the continuous pipe. A section of pipe 8 may then be placed on the rollers 20 and moved rearwardly over the roller cradle 44 and saddle 49 into abutment with the rear end of the pipe 28. The clamp 50 may then be engaged and the hydraulic jacks 52–58 may be manipulated as necessary to bring and hold the abutting ends of the pipes 8 and 28 into exact alignment and firm abutment whereupon they move as a unit rearwardly of the ramp 18 as the barge is propelled continuously forward. If necessary or desirable, internal or external pipe aligning means may also be used. During rearward movement the abutting ends of the pipes 8 and 28 may be initially welded sufficiently to properly hold them in alignment. During this interval of time the rearmost carriage 26 is likewise clamped to the pipe 28 and moving therewith and usually the carriage 26 reaches the proximity of the restraining means 30 before a weld can be completed over the forward carriage 24. During this interval of movement the welding of the joint is completed on the carriage 26 and the coating patched over the weld, in a manner to be described. During this interval of time the pipe 28 has moved rearwardly along the ramp 18 a distance sufficient to accommodate a further assembly 8 of pipe sections. The carriages 26 and 24 are then unclamped from the pipe, their respective saddles are lowered to clear the pipe and their carriages are then propelled forwardly with their roller cradles 44 still supporting and rolling along the pipe. They are propelled forwardly until the carriage 26 reaches the joint partially welded on the carriage 24 and the latter is moved forwardly to the then free end of the continuous length of pipe 28 and the described operations are repeated. Thus, it is possible to weld the pipe into a continuous length and launch it from the barge while the same moves forward continuously.

The carriage 26 may, if desired, be identical in construction to the carriage 24, as already described, but it is not essential that the saddles 48 and 49 be mounted for lateral adjustment. They must, however, be mounted for vertical adjustment into and out of engagement with the pipe and provision must be made for clamping one or both of them to the pipe. Actually, one of the saddles 48 or 49 may be eliminated from carriage 26 but the one retained must provide for clamping to the pipe. Each of the carriages 24 and 26 is provided with a pair of the described roller cradles so spaced apart that at least one of the pairs of rollers is always in supporting engagement with the pipe 28 while the other one is passing over the joint area wherein the coating has been cut away.

The restraining means 30, previously referred to, is shown in more detail in FIGS. 9 and 10. The restraining means may be fixedly mounted on the ramp 18 or may be fixedly mounted on the adjacent side of the barge 2. As shown in the drawings it is mounted on and fixed to the ramp 18 rearwardly of the tracks 22 and in position to receive the pipe 28. Preferably, the coating over the pipe 28 is patched where the sections were welded together previous to its entry into the restraining means 30. However, this is not essential since the patching of the joints could be accomplished rearwardly of the restraining means. As shown in FIG. 9, however, a joint patch 61 is shown as already applied to the pipe. This joint patch may be applied as shown in FIG. 13 wherein an expendable metal sleeve 62 is wrapped around the pipe 28 over the welded joint and in spanning relation to the gap in the coating after the welded joint and bare pipe are properly cleaned and primed. Suitable bands or the like 64 hold the sleeve 62 in position. The sleeve 62 is provided with an opening 66 through its top portion and through which a suitable mastic 68 may be poured or otherwise introduced to fill the space within the sleeve 62 and thus provide the necessary corrosion protection and/or weight at the welded joint. As shown in FIG. 13, a funnel 70 is employed to direct the mastic 68 into the opening 66 but the use of such a removable funnel is obviously optional. The sleeve 62 and bands 64 are left on the pipe and their ultimate corrosion and destruction in sea water is of no consequence.

Referring again to FIGS. 9 and 10, the restraining means comprises a framework 72 extending across the path of movement of the pipe 28. Below the pipe 28 the framework 72 rotatably supports a pair of pneumatically tired wheels 74 in position so that the tires of the wheels engage and support the pipe 28. Preferably, the tires are only lightly inflated so that they will engage the outer surface of the pipe 28 over a relatively large area thereof and are thus capable of transmitting large frictional forces through the engaging surface. An upper pair of pneumatically tired wheels 76 is journalled in individual journals 78, which are vertically adjustable on the framework 72, as by means of the screw devices 80 whereby the spacing between the upper and lower pairs of wheels may be adjusted to accommodate pipes of different size and whereby the clamping pressure applied to the pipe between the pairs of wheels may also be regulated. Each of the wheels 74 and 76 is fixed to its supporting shaft. Each of the shafts supporting the wheels 74 has a sprocket wheel 82 mounted thereon and each sprocket wheel drives a chain 84. Each of the chains 84 is trained over a further sprocket wheel 86 on a central shaft 88, which has a further sprocket wheel 90 fixed thereon. The sprocket wheel 90, through chain 92, drives a positive displacement hydraulic pump 94. The pump 94 is in a closed hydraulic system, indicated at 96, which may include a reservoir 98 and a cooling system 100 and also an adjustable flow restricting valve 102.

Through a similar arrangement of sprocket wheels, chains, and intermediate shaft 104, the upper pair of wheels 76 drive an electrical generator 106. The output of the generator 106 may be connected to any desired sort of a load device such as a variable resistance apparatus or the energy generated by the generator of 106 may be recovered in the form of power applied to the propelling system for the barge. In any event, it will be apparent that the driving connections between the pipe 28, wheels 76, and generator 106, results in the imposition of a high restraining force tending to prevent rearward motion of pipe 28 through the restraining means. The valve 102 in the hydraulic system 96 may likewise be regulated so as to increase or decrease, and thus adjust, the total restraint imposed on the pipe 28 by the restraining means 30.

Preferably the restraining means 30 will be provided with dog clutch means whereby some or all of the wheels 74 and/or 76 may be positively locked against rotation to thereby lock the pipe 28 and barge 2 against relative movement.

Obviously the restraining loads could all be electric or hydraulic, but it is believed the combination described is best.

As stated previously, the pipe, after being launched rearwardly of the barge is directed along a string of articulated float members. These members are shown in more detail in FIGS. 11 and 12. The articulated string 34 of float members comprises a plurality of hollow pipe sections 108, each of which may be a 40 foot mill length. Each pipe section is provided with caps 110 and 112 at its opposite ends, which caps inter-engage with caps on an adjacent length of pipe and are pivotally joined thereto as by means of pins 114. Preferably, alternate pivot pins 114 are arranged so that their axes extend at right angles to the pivot pins at the other ends of the sections thus joined so that the articulated string 34 will be capable of flexure in any direction. Each of the pipe sections 108 has a roller cradle 37 clamped thereto as by means of a releasable clamp structure 116. The roller cradles each comprise sections 118 and 120 hinged together as at 122 whereby upon release of the clamp means 116, the sections may swing apart to be applied to a length of pipe 28 between the ends thereof. Each of the cradles 37 is provided with a pair of rollers 124 journalled thereon in a manner to define a generally V-shapel cradle to engage and movably support the pipe 28. Preferably, the supporting axle for the right hand roller 124 (as seen in FIG. 12) is readily removable from its supporting bearing whereby to permit separating movement of the sections 118 and 120 about their hinge axis 122.

The foremost pipe section 108 is releasably clamped to the side of the barge 2 by the hydraulically operated clamping mechanism 36. This clamping mechanism comprises a relatively fixed clamping jaw 128 and a movable jaw 130 operable by a reversible hydraulic motor 132. A link 134 is connected at one end to the movable jaw 130 and at its other end is secured to the side of the barge 2 whereby to restrain the movable jaw 130 against rearward movement.

The caps 110 and 112 on the ends of the pipe sections 108 are provided, respectively, with two apertured ears and one apertured ear. As shown, the cap 110 having two apertured ears may be at the forward end of the foremost pipe section 108. To this cap 110 a clevis 140 is applied and which is engaged by an end of a cable 142 and is also secured to an end of a further cable 144. The cable 142 extends forwardly from the clevis 140 over an idler pulley 146 and onto one drum of a two-drum winch 148 (see FIGS. 1, 3 and 4). The cable 144 extends rearwardly from the clevis 140, over a further idler pulley 150 and then to a second drum on the winch 148. It will be obvious that upon release of the clamp 36 the winch 148 may be operated to draw the articulated string 34 of floats forwardly or to force the same rearwardly and thus permit the addition of further pipe sections 108 to the articulated string or the removal of some pipe sections therefrom. Since the articulated string 34 extends downwardly and rearwardly at an angle and since it is buoyant, release of the clamp 36 would normally permit the articulated string to float upwardly and forwardly, as guided by the cradles 37, and for this reason, cable 144 is normally kept in tension to prevent such unwanted movement when the clamp 36 is released. When a new section of pipe 108 is added to the forward end of the pipe section shown, the connection is performed while the clamp 36 is engaged so that clevis 140 may be released from cap 110. After connection of a further pipe section forwardly of the foremost section shown in FIG. 11, the clevis 140 is moved to the front end of that new section whereupon the cable 144 is tightened, clamp 36 is released, and the winch 148 operated to force the string 34 rearwardly through the loosened clamp 36 until the latter is in position to engage the newly added pipe section. Thereafter, a cradle 37 is opened and caused to embrace the pipe 28 and then clamped to the pipe section 108, which was previously the foremost section in the string 34.

The size and number of pipe sections 108 in the articulated string 34 are chosen so that their total buoyant effect on the suspended portion of pipe 28 is sufficient to nearly but not quite completely support the same. Obviously, the total assembly must still have some negative buoyancy so that the pipe being launched will go to the bottom of the ocean. If necessary, each of the pipe sections 108 may be partially filled with water or other ballast to regulate the buoyancy thereof. The size of pipe used for the string 34 will be large enough to give the desired lifting for the largest or heaviest pipe 28 contemplated, for lighter pipe 28 the sections 108 may be partially filled with water, to the extent necessary.

In underwater pipe laying operations, particularly in parts of the ocean, there are times when it is necessary to "abandon" the pipe and for the barge to seek safety in sheltered waters. The present invention provides for this contingency and is inherently capable of permitting such operation while yet providing for recovery of the abandoned pipe and continuation of the laying operation. When conditions indicate that it would be advisable to abandon the pipe and seek sheltered waters, a bull cap 160 (see FIG. 2) is welded to the forward end of the pipe 28 to close and seal the same and a cable 162 is attached thereto. The articulated buoyant string 34 is then completely released from the barge 2 and clamped to the pipe 28 in any suitable manner (not shown). The cable 162 is then controlled by a winch 164 (see FIG. 1) to maintain control of the free end of the pipe 28 while the latter is permitted to move through the restraining means 30 and off the rear end of the barge. The cable 162 and winch 164 are then employed to apply the previously described restrain so as to maintain the required tension on the pipe 28 while the free end thereof is lowered to the bottom of the ocean along with the buoyant string 34, as shown in FIG. 2. A crane 168 may also be used to assist in controlling pipe 28 at this time. A marker buoy 166 may then be secured to the cable 162 to indicate the position of the end of the pipe 28 and the barge may then proceed to safer waters. Thereafter, the barge may return to the buoy 166 and by reversing the described processes the end of the pipe 28 may be recovered and repositioned over the ramp 18 and the pipe assembling and laying operation can continue as before. To recover the pipe, upon return of the barge to the site marked by buoy 166, the cable 162 is picked up and pulled through restraining means 30 by winch 148 and/or crane 168. Then the barge moves forward while paying out sufficient cable to give the proper forward lifting and pipe tensioning angle and the winch 148 operated, in opposition to propelling force on the barge, to effect lifting the pipe end and positioning the same through restraining means 10. The latter is then brought into operation, float string 34 is secured by clamp 36, plug 160 is cut off the end of pipe 28 and the apparatus is then ready to resume the earlier-described pipe laying operations.

Ships and other buoyant vehicles generally have good resistance to longitudinal pitching but have low resistance to lateral rolling motion due to wave action. A lay barge of the type contemplated herein should be as stable as possible in a lateral direction. This is particularly true in the described embodiment wherein the ramp 18 is located at one lateral edge of the barge. Rolling motion about the longitudinal axis of the barge causes the ramp 18 to rise and fall relative to the ocean bottom and thereby tends to impart energy and motion to the tensioned pipe, which in turn increases the stresses therein and causes them to fluctuate to a degree that may become destructive. In addition, the storage and handling of heavy cylindrical pipe is quite dangerous on a rolling barge and for that reason also it is desirable to keep the roll to a minimum.

Two systems have been used in the past to laterally stabilize ships, the gyroscope and retractable vanes which can be caused to protrude from the sides of the vehicle and titled periodically to give negative lift to the rising side of the ship and positive lift to the descending side. The gyroscope system, however, imposes heavy strain on the hull of a ship and is a bulky and expensive apparatus. The vane system depends for its stabilizing effect on the forward speed of the ship through the water. A lay barge as contemplated herein would not have substantial forward speed and in many instances, may be stationary part of the time so that the vane system of stabilization cannot be employed. The present invention contemplates a power driven propeller arrangement for effecting lateral stabilization.

Referring to FIGS. 1, 4, 5 and 14, there is shown protruding from the bottom of the barge 2 a stabilizing apparatus 170. The apparatus 170 is shown schematically in FIG. 14 and comprises a housing or support 172 having a pair of laterally and oppositely directed propellors 174 journalled thereon. It is undesirable to have such a mechanism projecting downwardly from the bottom of the barge at all times so it is contemplated that the housing 172 be mounted for vertical movement. A well 176 is formed at the bottom of the barge so that the mechanism may be extended downwardly to the position shown in the drawings when in use and may be retracted within the well 176 when the barge is travelling or in shallow water.

Each of the propellors 174 is connected through a clutch mechanism 177 to a bevelled gear 178. Each bevelled gear 178 in turn meshes with a bevelled gear 180 on a power operated drive shaft 182. The shaft 182 is connected to any suitable source of power and preferably can be driven at selected different speeds. Each of the clutches 177 is normally disengaged and may be of any known or suitable type actuated by electrical means, hydraulic means, or other medial. A pendulous weight 184 is suspended from a suitable support 186 on the barge 2 and its suspension arm 188 is pivotally connected to one end of a piston rod 190. The piston rod 190 is secured to a piston 192 in a cylinder 194. The cylinder 194 is preferably closed and is kept constantly supplied with hydraulic fluid from a reservoir 196, through a suitable check valve (not shown). The piston 192 may be provided with a restricted opening therethrough so that both sides of the piston will be constantly supplied with the hydraulic fluid. Connected in pressure responsive relation to each end of the cylinder 194 are pressure responsive switches 198. The switches 198 are in turn respectively connected through suitable means 200 to the clutches 177, previously described. In referring to elements 198 as switches, applicant intends to indicate that they may be any pressure responsive device capable of controlling or actuating a clutch 177. The pendulous weight 184 is suspended for lateral swinging movement on the barge 2 and is inertially responsive to any rolling motion of the barge. Thus, the weight 184 will detect the start of any rolling motion of the barge 2 and will thereby exert a force on the piston 192 in one direction or the other. This force applied to the piston 192 is transmitted through the hydraulic fluid in cylinder 194 to one or the other of the pressure responsive devices 198 which when actuated will effect engagement of its associated clutch 176 and thus impart a thrust to the bottom of the barge in one direction or the other, depending upon the direction in which the barge tends to roll. Obviously, the parts will be so arranged that a propellor 174 is driven to produce thrust which will resist the rolling motion detected by the weight 184. That is, the operated propellor 174 will actually supply a torque to the barge about the longitudinal axis thereof. The magnitude of the torque can be controlled or predetermined by the speed of the shaft 182, which will be preselected in accordance with the magnitude of the waves then prevalent in the vicinity. As is apparent from the figures, the line of thrust produced by the propellors 174 is substantially below the bottom of the barge and thus well below the center of lateral pressure of the water on the sides of the barge and this fact results in the production of the torque mentioned above.

While a single specific embodiment of the invention has been shown and described herein, it is to be understood that the same is merely illustrative of the principles involved and that other embodiments may be employed within the scope of the present invention, as defined by the appended claims.

I claim:

1. The method of laying continuous non-buoyant pipe in a body of deep water, from a buoyant vehicle, comprising the steps of: moving said vehicle forwardly while directing said pipe off the rear thereof and downwardly into the water; continuously applying a uniform but yieldable restraining force between said pipe and vehicle to thereby uniformly and constantly restrain movement of said vehicle relative to said pipe in a forward direction; and applying a forward propelling force to said vehicle of sufficient magnitude to overcome said yieldable restraint and to move said vehicle forwardly relative to said pipe, the extent of said restraining being sufficiently great that the rearwardly extending portion of said pipe is held under substantial and continuously uniform tension.

2. The method of claim 1 wherein the forward end of said pipe is supported over a portion of said vehicle and including the further steps of sequentially securing additional sections of pipe to said forward end of said pipe while moving said vehicle forwardly at a continuous and substantially uniform rate.

3. The method of laying continuous non-buoyant pipe in a body of deep water subject to wave action of natural frequency, from a buoyant vehicle, comprising the steps of: moving said vehicle forwardly on the surface of said body of water while directing said pipe off the rear thereof and downwardly and rearwardly to the bottom of said body of water; applying a restraining force between said pipe and said vehicle to thereby hold the portion of said pipe suspended between said vehicle and said bottom under sufficient tension to establish a period of vibration in said suspended portion which is materially different from said natural frequency whereby movements of said vehicle caused by said wave action and transmitted to said suspended portion will not set up destructive oscillations in said suspended portion.

4. Apparatus for laying continuous non-buoyant pipe in a body of deep water, comprising: a buoyant vehicle having means thereon for propelling the same forwardly and for controlling the lateral position thereof; guide means on said vehicle for guiding said pipe rearwardly over a portion thereof and over the rear end thereof; restraining means on said vehicle adjacent the rear thereof and engageable with said pipe to partially restrain rearward movement of said pipe relative to said vehicle, said restraining means comprising at least one pair of opposed wheels frictionally engaging opposite sides of said pipe and power absorbing means driven by at least one of said wheels.

5. Apparatus as defined in claim 4 wherein said power absorbing means comprises an electrical generator.

6. Apparatus as defined in claim 4 wherein said power absorbing means comprises a liquid circulating pump in a closed liquid circuit and means for selectively restricting said circuit to regulate the restraint applied by said one wheel to said pipe.

7. Apparatus for laying continuous non-buoyant pipe in a body of deep water, comprising: a buoyant vehicle having means thereon for propelling the same forwardly and for controlling the lateral position thereof; guide means on said vehicle for guiding said pipe rearwardly over a portion thereof and over the rear end thereof; restraining means on said vehicle adjacent the rear thereof and engageable with said pipe to partially restrain rearward movement of said pipe relative to said vehicle, and a string of rigid buoyant members mutually pivoted together, said string being secured to and extending rearwardly from said vehicle and along said pipe; and a plurality of roller cradle means depending from said members and supportingly engaging said pipe.

8. Apparatus as defined in claim 7 wherein each of said members is a hollow elongated rigid structure releasably pivotally joined to adjacent members; said string being secured to said vehicle by means of a releasable clamp on said vehicle and engaging the foremost one of said members; and means on said vehicle for selectively moving said foremost member, and thereby said string, forwardly or rearwardly of said vehicle when said clamp is released.

9. Apparatus for laying continuous non-buoyant pipe in a body of deep water, comprising: a buoyant vehicle having means thereon for propelling the same forwardly and for controlling the lateral position thereof; guide means on said vehicle for guiding said pipe rearwardly over a portion thereof and over the rear end thereof; restraining means on said vehicle adjacent the rear thereof and engageable with said pipe to partially restrain rearward movement of said pipe relative to said vehicle, said portion of said vehicle comprising a ramp structure, on one side of said vehicle, extending downwardly and rearwardly to a lower end at the rear of said vehicle and adjacent the waterline thereof, said guide means including at least one carriage movable along said ramp forwardly of said restraining means and having pipe supporting and clamp means thereon for clamping said carriage to said pipe in supporting relation thereto, said carriage being provided with a pair of said pipe supporting means longitudinally spaced thereon; and selectively operable means for adjustably selectively moving each of said supporting means laterally or vertically relative to said carriage.

10. Apparatus for laying continuous non-buoyant pipe in a body of deep water, comprising: a buoyant vehicle having means thereon for propelling the same forwardly and for controlling the lateral position thereof; guide means on said vehicle for guiding said pipe rearwardly over a portion thereof and over the rear end thereof; restraining means on said vehicle adjacent the rear thereof and engageable with said pipe to partially restrain rearward movement of said pipe relative to said vehicle, said portion of said vehicle comprising a ramp structure, on one side of said vehicle, extending downwardly and rearwardly to a lower end at the rear of said vehicle and adjacent the waterline thereof, said guide means including at least one carriage movable along said ramp forwardly of said restraining means and having pipe supporting and clamp means thereon for clamping said carriage to said pipe in supporting relation thereto, said carriage being further provided with drive means for propelling the same along said ramp; and at least one roller cradle on said carriage arranged to engage and support said pipe independently of said clamp means.

References Cited

UNITED STATES PATENTS

| | | | |
|---|---|---|---|
| 2,910,835 | 11/1959 | Timothy | 61—72.3 |
| 2,924,328 | 2/1960 | Lidderdale | 61—72.3 X |
| 3,262,275 | 7/1966 | Perret | 61—72.3 |

FOREIGN PATENTS

| | | |
|---|---|---|
| 922,919 | 4/1963 | Great Britain. |
| 947,196 | 1/1964 | Great Britain. |
| 128,713 | 1960 | U.S.S.R. |

OTHER REFERENCES

The Oil and Gas Journal, May 26, 1958, pp. 60–61.

DAVID J. WILLIAMOWSKY, *Primary Examiner.*

J. SHAPIRO, *Assistant Examiner.*

Notice of Adverse Decision In Interference

In Interference No. 96,691 involving Patent No. 3,321,925, C. W. Shaw, DEEP WATER LAY BARGE AND METHOD, final judgment adverse to the patentee was rendered June 26, 1972, as to claim 1.

[*Official Gazette November 21, 1972.*]